June 4, 1935. W. H. CRISWELL 2,004,037
METHOD OF REPAIRING TIRE CASINGS
Filed May 14, 1934
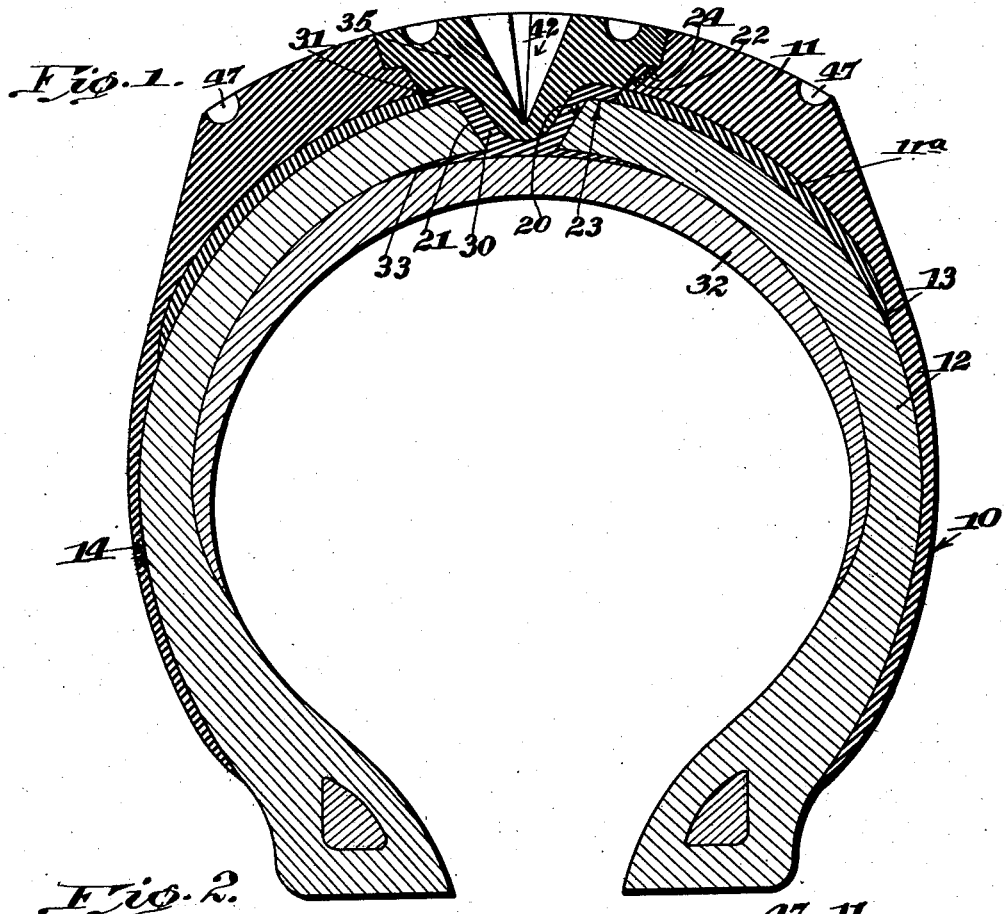
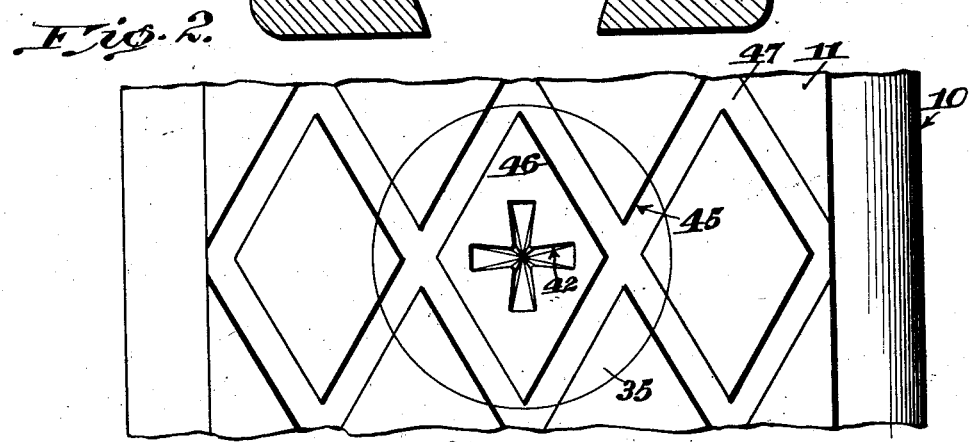
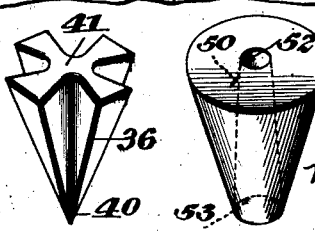

Patented June 4, 1935

2,004,037

UNITED STATES PATENT OFFICE 2,004,037

METHOD OF REPAIRING TIRE CASINGS

Walter H. Criswell, Seattle, Wash.

Application May 14, 1934, Serial No. 725,628

6 Claims. (Cl. 18—59)

This invention relates to a method of repairing tire casings.

It has been proposed to repair tire casings by replacing sections of the tire but where casings have been repaired for use on trucks or busses that travel at high speeds it has been found that such sectional repairs have not been practicable. This is due to the fact that the methods devised employ a solid rubber plug which extends far into the carcass and it is impossible to provide a resiliency in the rubber plug which is equivalent to that of the carcass so that every time the tire flexes at the point where the plug has been vulcanized into the casing friction is set up causing the repair or job to heat and blow out.

An object of the invention is the provision of a rubber plug which is vulcanized in a pocket formed by cutting away a portion of the tire casing where the injury has occurred and vulcanizing a rubber filler in the pocket with the filler containing a matrix which is removed after vulcanization, the cavity thus formed by the removal of the matrix providing for a resiliency which is equivalent to the resiliency of the carcass, thereby eliminating friction.

A further object of the invention is the provision of a rubber plug for application to an injured portion of a tire casing with the plug containing a removable matrix before the plug has been vulcanized in position, the removal of the matrix providing for a tapered cavity in the plug to provide for a resiliency equivalent to the resiliency of the carcass, the cavity being preferably in the shape of a core or Maltese cross with the inner end of the cavity having a greatly reduced cross sectional area, the particular form of the cavity providing for the expulsion of sand and gravel which would tend to collect in the cavity.

A still further object of the invention is the provision of a method for repairing a tire casing by removing from said casing a predetermined portion of the casing embracing the injury to form a pocket having inclined walls with the wall intermediate the inner and outer ends of the pocket having a horizontal portion, a filler being vulcanized in the pocket and having a cavity to eliminate friction and likewise a higher temperature at this point to prevent blowing out of the plug, the inner portion of the pocket being lined with a gum of substantially the same nature as the usual gum employed in connection with the fabric or cords.

This invention will be best understood from a consideration of the following detailed description, in view of the accompanying drawing forming a part of the specification; nevertheless, it is to be understood that the invention is not confined to the disclosure, being susceptible of such changes and modifications which shall define no material departure from the salient features of the invention as expressed in the appended claims.

In the drawing:

Figure 1 is a transverse vertical section of the tire casing showing my method of repair, Figure 2 is a fragmentary plan view of the casing repaired as shown in Figure 1, Figure 3 is a view in perspective of the matrix to provide a cavity in a filler plug which has been vulcanized in the casing, and Figure 4 is a view in perspective of a preferred form of matrix.

Referring more particularly to the drawing, 10 designates a casing having a tread portion 11, and a carcass 12 which is formed in the usual manner of caliendered fabric or cords. A breaker strip 11$^a$ is located between the tread 11 and the carcass 12 with the side edges of the breaker strip terminating, as shown at 13, adjacent those portions of the tread where they merge into the rubber 14 which is vulcanized to the outer walls of the carcass 12.

When the casing has been injured as by cutting, or in any other manner, the tread 11 as is the carcass 12, is cut away along those portions which embrace the injury to provide a pocket, generally designated by the numeral 20. The walls 21 and 22 of the pocket are cut at an angle of 45° while the portions 23 and 24 of the walls are located at substantially a right angle to the central axis of the pocket or are located in horizontal planes. If the angular cut of the side walls were made at a continuous 45° angle to the surface of the tread there would be left a thin edge on the replaced spot exposed to the road surface which is apt to scrape off and permit sand to work in and thus loosen up the spot or weld causing the same to peel out. Furthermore, the stepped arrangement of the side walls of the pocket provides for a greater surface or attachment for the new rubber or plug and breaks up the traction wave.

In forming the pocket care is exercised to prevent cutting of the cords or threads of the carcass any deeper than is necessary so that the remaining cords of the carcass which have not been injured will give greater strength to the injured portion after the plug has been vulcanized in position.

The inner end of the pocket 20 is lined with a cushion gum 30 which terminates at its upper end, as shown at 31, in alinement with the cut away portions of the breaker strip. The gummed lining is of substantially the same nature as the usual gum employed in which the cords or fabrics are caliendered when the tire is made.

Several layers or plies of cords 32 are applied to the inner surface of the casing and are cemented thereto below the pocket 20 to provide additional strength at this point where the injury has been of such an extent that it passes substantially through the carcass 12. The gum, as shown at 30, may be extended at 33 to the inner wall of the carcass to provide an additional cushion between the member 32 and the carcass 12.

A plug 35 formed of vulcanizable rubber is neatly filled into the pocket and a matrix 36 is imbedded in the rubber or filler 35 for a purpose which will be presently explained. The assembled repair patch or filler being in position together with a reinforcing strip 32, the whole is placed in a vulcanizing machine and maintained in the machine until an integral bond is formed between the plug 35, the cushion gum 30, and the reinforcing strip 32. When the vulcanizing process has been completed the casing is then removed.

The matrix 36 is then removed, leaving a pocket in the filler 35 which is complementary to the matrix 36 to form a cavity which will provide for greater resiliency at the points where the tire has been repaired and thus prevent friction and the blowing out of the plug due to the overheating of the plug when in operation.

The plug is preferably pointed with the pointed ends 40 being located inwardly of the tire with the enlarged or expanded portion 41 disposed substantially in the plane of the outer face of the tread 11. This plug is preferably in the shape of an inverted truncated cone due to the fact that this form, although not absolutely essential, provides a cavity which will expel sand, gravel, or other foreign matter therefrom during operation.

As shown more particularly in Fig. 2, the complementarily formed cavity 42, is disposed substantially centrally of the filler or plug 35.

After the plug has been vulcanized in position and the matrix 36 removed, a specially constructed tool is employed for cutting grooves 45 and 46 which conform to the design of the grooves 47 which were originally formed in the tread 11.

It will be noted that when the repair job is built up in the pocket 20, the cushion gum 30 is given substantially the same thickness as the breaker strip. The plug 35 is built up in the pocket with tread gum in the usual manner.

The matrix 36 or 36ª is preferably formed of some metal such as aluminum so that it will not form an integral unit with the filler 35. The matrix is designed to provide a cavity which flexes readily but provides as great a tread surface as possible.

The thickness of the cross patch 32 located interiorly of the casing depends entirely upon the depth of the injury.

As has been previously explained, the pocket 20 is provided with inclined side walls of approximately 45° but is interrupted at points with square corners so that when the new rubber is packed into the pocket trapping of air will be eliminated, while the broken condition of the side walls provides for a greater surface for the application of the tread gum of the filler 35.

After the pocket has been cut the side walls of the pocket are roughened with an especially constructed roughening tool so that the gum when vulcanized in position will have sufficient surface to be retained in position within the pocket.

The preferable form of the matrix is shown at 36ª in Fig. 4 and has the shape of an inverted truncated cone. Centrally of the matrix is provided a tapered passage 50, the outer end 52 of which is of less cross-sectional area than the inner end 53.

This matrix is placed in the plug 35 in the same manner as the matrix 36. The passage 50 receives the vulcanizable rubber of the plug so that when the vulcanizing process has been completed and the matrix 36ª has been removed a pillar of rubber will remain in the central portion of the pocket and this pillar prevents the accumulation of foreign matter in the pocket. The pillar of course is tapered outwardly from the base of larger cross-sectional area. This base portion is formed integrally with the plug.

I claim:

1. The method of repairing tire casings which comprises removing a section of the casing embracing the injured portion to form a pocket, applying a filler to the pocket while providing a cavity centrally of the filler, and a projection extending outwardly from the bottom of said cavity, then vulcanizing the filler and projection.

2. The method of repairing tire casings which comprises removing a section of the casing embracing the injured portion to form a pocket, applying a filler to the pocket containing a tapered and removable matrix with the reduced end of the matrix being located adjacent the inner portion of the casing, removing the matrix to provide a tapered cavity in said filler, the tapered walls of the pockets tending to eject foreign matter which will work its way into the cavity.

3. The method of repairing tire casings which comprises removing a section of the casing embracing an injured portion to form a pocket having inclined walls and an intermediate horizontal wall, and vulcanizing a filler in the pocket, said filler being provided with a cavity.

4. The method of repairing tire casings which comprises removing a section of the casing embracing an injured portion to form a pocket having inclined walls and an intermediate horizontal wall, applying a filler to the pocket, said filler having a matrix removably embedded therein, vulcanizing the filler and removing the matrix to provide a cavity in said vulcanized filler.

5. The method of repairing tire casings which comprises removing a section of the casing embracing an injured portion to form a pocket having inclined walls and an intermediate horizontal wall, lining with a cushion gum the inner portion of the pocket to points outwardly of the pocket when the breaker strip is exposed in the pocket, applying a filler to the pocket, said filler having a matrix removably embedded therein, vulcanizing the filler and removing the matrix to provide a cavity in said vulcanized filler.

6. The method of repairing tire casings which comprises removing a section of the casing embracing an injured portion of the casing to form a pocket, lining the pocket with gum, applying a filler to the pocket, the filler containing a removable and tapered matrix, the matrix being in the shape of a truncated cone through the center of which is a hole having a reverse taper, the filler also being continued through the hole, vulcanizing the filler in the pocket and in the hole, then removing the matrix.

WALTER H. CRISWELL.